J. EVANS.
MACHINE FOR DISINTEGRATING FIBROUS PLANTS.
No. 50,108. Patented Sept. 26, 1865.
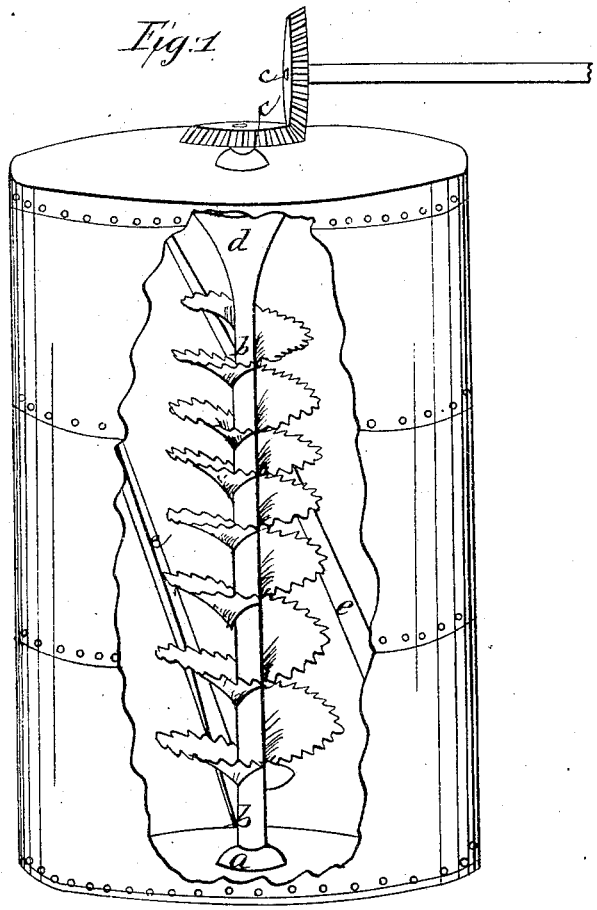
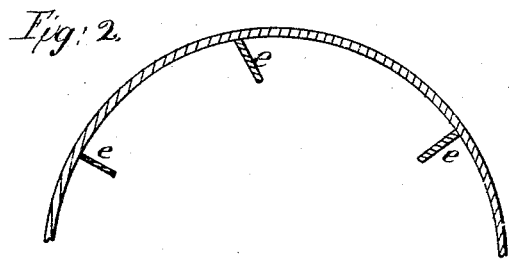
Witnesses;
W. M. Gording
Chas. H. Skinner
Inventor;
Joseph Evans

UNITED STATES PATENT OFFICE.

JOSEPH EVANS, OF NEWARK, NEW JERSEY.

IMPROVEMENT IN MACHINES FOR DISINTEGRATING FIBROUS PLANTS.

Specification forming part of Letters Patent No. 50,108, dated September 26, 1865.

*To all whom it may concern:*

Be it known that I, JOSEPH EVANS, of the city of Newark, in the county of Essex and State of New Jersey, have invented an Improvement in Machines for Disintegrating Fibrous Plants for the Manufacture of Paper, &c.; and I do hereby declare the following to be a full and exact description thereof, reference being had to the drawings that accompany this specification, and which make part of the same.

The nature of my improvement consists in the use of a peculiarly-constructed spiral screw or screws revolving in the interior of a boiler that has sections of spirals attached to it inside.

In the drawings, Figure 1 represents a boiler with a part of the side removed to show the screw and the sections of spirals in its inside. Fig. 2 shows the ends of the sections of spirals.

A boiler of any required dimensions is made with a step or bearing, *a*, for the end of the shaft *b*, on one end inside, and a hole through the other end for the shaft *b* to pass through, the shaft being driven by the wheels *c* or by pulleys, as the case may be. Around the shaft *b* a spiral screw is formed.

The edges of the screw can be roughened in places or all along. They may be serrated, as shown, wholly or in part, any roughness facilitating the process of disintegration. They are, therefore, preferred to smooth edges.

A cone, *d*, is placed apex downward above the spiral, which throws off the material that passes up the screw.

Sections of spirals *e* projecting inward are attached to the inside of the boiler, standing on a line to the center or placed obliquely thereto, as shown in Fig. 2, their use being to incline the material to descend while in agitation. The straw or other fibrous plant is put into the boiler whole or cut, as may be desired, accompanied with the usual solvents, and, being nearly covered with water, is then heated. The screw or screws—as more than one are sometimes put into one boiler—are then set in motion, with a gradual increasing of the motion as the material becomes disintegrated or pulped.

What I claim and desire to secure is—

1. The use, for the object specified, of toothed or plain-edged screws, constructed and operated in the manner herein set forth.

2. The boiler with the inside projection, when used in combination with a screw or screws.

JOSEPH EVANS.

Witnesses:
  W. M. GOODING,
  CHAS. H. SKINNER.